US011912019B2

(12) United States Patent
Takahashi

(10) Patent No.: US 11,912,019 B2
(45) Date of Patent: Feb. 27, 2024

(54) PRINTING APPARATUS

(71) Applicant: BROTHER KOGYO KABUSHIKI KAISHA, Nagoya (JP)

(72) Inventor: Hiroaki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 26 days.

(21) Appl. No.: 17/583,757

(22) Filed: Jan. 25, 2022

(65) Prior Publication Data

US 2022/0242147 A1 Aug. 4, 2022

(30) Foreign Application Priority Data

Jan. 29, 2021 (JP) ................................ 2021-013972

(51) Int. Cl.
*B41J 11/66* (2006.01)
*B41J 11/70* (2006.01)

(52) U.S. Cl.
CPC .................................. *B41J 11/663* (2013.01)

(58) Field of Classification Search
CPC . B41J 11/663; B41J 11/70; B41J 11/66; B41J 11/68; B41J 13/0036; B41J 13/106
See application file for complete search history.

(56) References Cited

U.S. PATENT DOCUMENTS

2012/0204785 A1* 8/2012 Sato ................... B65H 23/0322 118/46
2020/0207102 A1* 7/2020 Fukasawa ................ B41J 2/175
2021/0122174 A1 4/2021 Tanaka et al.
2022/0080753 A1* 3/2022 Kitahara ................ B41J 11/005

FOREIGN PATENT DOCUMENTS

CN 102343727 B * 8/2016 ............. B41J 11/70
JP 2018-186448 A 11/2018
JP 2020-011393 A 1/2020
JP 2020154426 A * 3/2022 ............. B41J 11/42

OTHER PUBLICATIONS

Kitahara, MachineTransationofJP-2020154426-A, (Year: 2020).*
Mihashi, Machine TranslationofCN-102343727-B, 2016.*

* cited by examiner

*Primary Examiner* — Scott A Richmond
(74) *Attorney, Agent, or Firm* — Merchant & Gould P.C.

(57) ABSTRACT

A printing apparatus includes: a plurality of conveyors configured to convey a recording medium in a conveyance direction; an image recording device configured to record an image on the recording medium; a divider disposed downstream of the conveyors and the image recording device in the conveyance direction, the divider being configured to perform a dividing process including dividing the recording medium into a plurality of pieces; and a controller configured to bring the divider into contact with the recording medium to perform the dividing process on the recording medium with holding an upstream side relative to a central position of the recording medium in the conveyance direction by at least two or more of the plurality of conveyors.

18 Claims, 9 Drawing Sheets

PRINTING APPARATUS

CROSS-REFERENCE TO RELATED APPLICATIONS

This application is based on and claims priority under 35 USC 119 from Japanese Patent Application No. 2021-013972 filed on Jan. 29, 2021, the contents of which are incorporated herein by reference.

TECHNICAL FIELD

The present disclosure relates to a printing apparatus.

BACKGROUND

A related-art image forming apparatus is provided with a cutting unit that cuts a sheet on which images are formed. For example, the related-art image forming apparatus has a configuration that a sheet on which an image is formed by an image forming unit is cut into two equal pieces by a sheet cutting unit, which is provided downstream of the image forming unit in a sheet conveying direction.

SUMMARY

One illustrative aspect of the present disclosure provides a printing apparatus including: a plurality of conveyors configured to convey a recording medium in a conveyance direction; an image recording device configured to record an image on the recording medium; a divider disposed downstream of the conveyors and the image recording device in the conveyance direction, the divider being configured to perform a dividing process including dividing the recording medium into a plurality of pieces; and a controller configured to bring the divider into contact with the recording medium to perform the dividing process on the recording medium with holding an upstream side relative to a central position of the recording medium in the conveyance direction by at least two or more of the plurality of conveyors.

Another illustrative aspect of the present disclosure provides a printing apparatus including: a plurality of conveyors configured to convey a recording medium in a conveyance direction; an image recording device configured to record an image on the recording medium; a machining device disposed downstream of the conveyors and the image recording device in the conveyance direction, the machining device being configured to perform one of (i) cutting, (ii) perforation formation, and (iii) crease formation on the recording medium; and a controller configured to control the machining device to perform one of the (i) cutting, (ii) perforation formation, and (iii) crease formation with holding an upstream side relative to a central position of the recording medium in the conveyance direction by at least two or more of the plurality of conveyors.

According thereto, it becomes possible to reduce a size of a printing apparatus and to reduce positional displacement of a recording medium when the recording medium is divided by a divider.

BRIEF DESCRIPTION OF DRAWINGS

Illustrative embodiments of the present disclosure will be described in detail based on the following figures, wherein.

DETAILED DESCRIPTION

The above-described related-art image forming apparatus has not been miniaturized since conveyance rollers are provided downstream of the sheet cutting unit in the sheet conveyance direction.

Therefore, illustrative aspects of the present disclosure provide a compact printing apparatus that can reduce positional displacement of a recording medium when the recording medium is divided by a divider.

First Illustrative Embodiment

Hereinafter, a printing apparatus 1 according to a first illustrative embodiment of the present disclosure will be described with reference to FIGS. 1 to 7.

Configuration of Printing Apparatus

Figure 1:
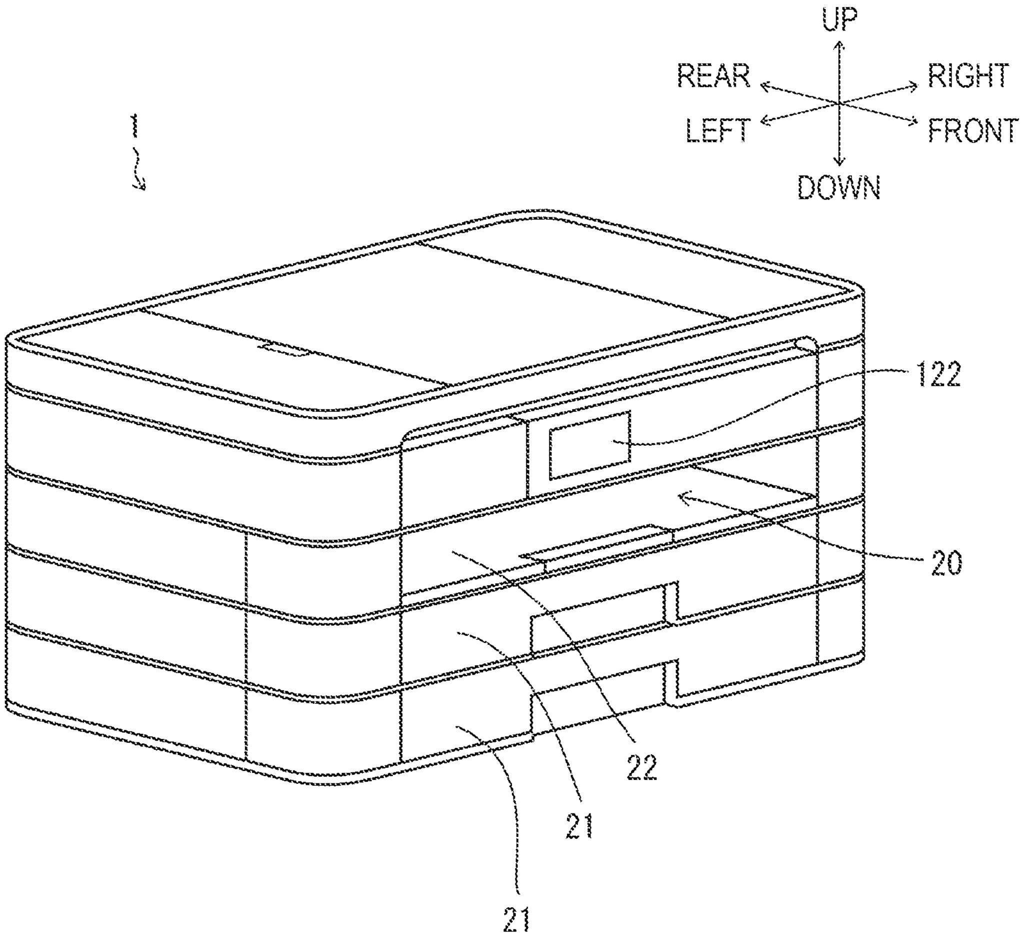
FIG. 1 is a diagram showing an appearance of a printing apparatus according to a first illustrative embodiment of the present disclosure.
Figure 2:
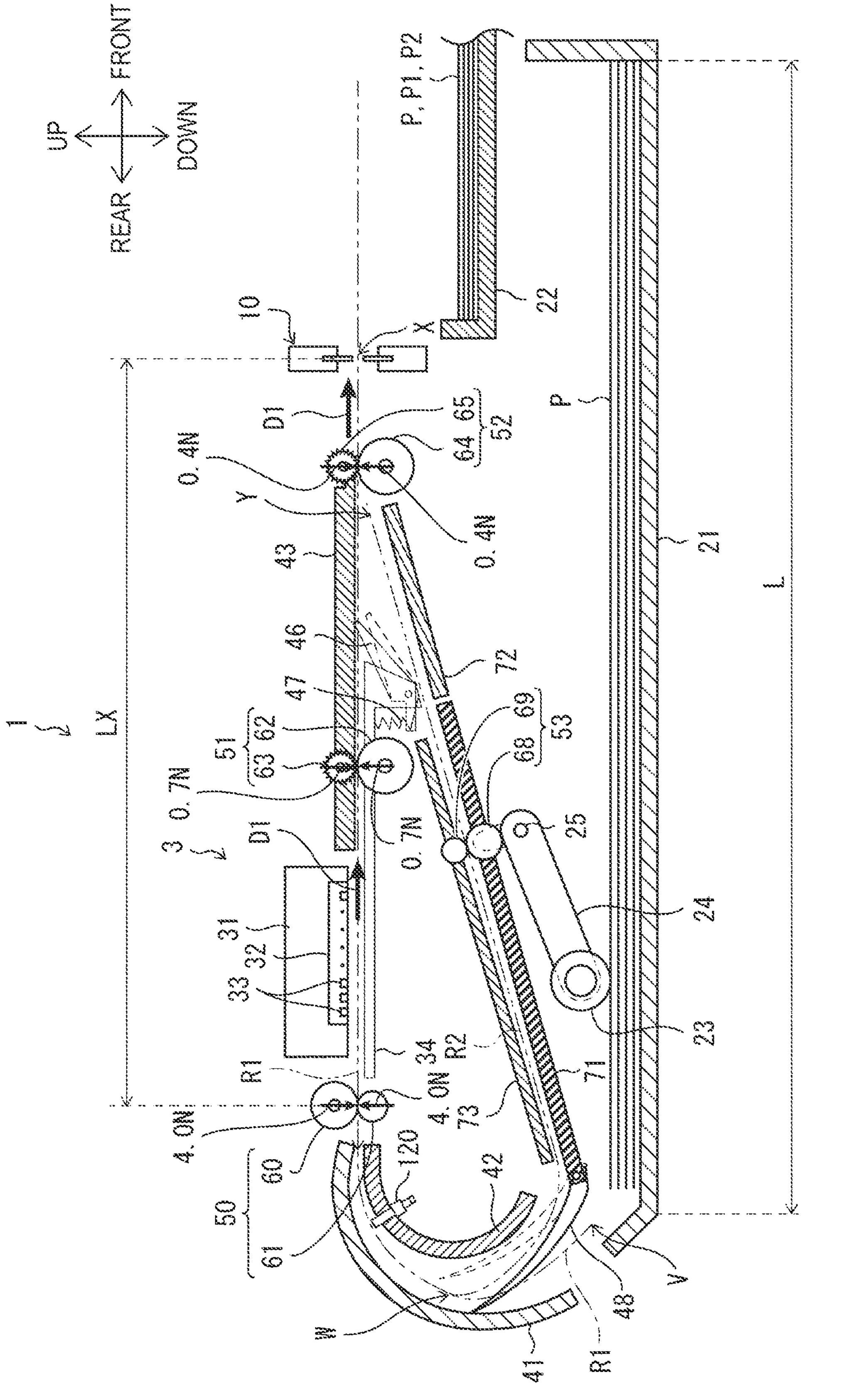
FIG. 2 is a cross-sectional diagram showing an internal structure of the printing apparatus according to the first illustrative embodiment.

FIG. 1 is a diagram showing an appearance of the printing apparatus 1 according to the first illustrative embodiment. FIG. 2 is a cross-sectional diagram showing an internal structure of the printing apparatus 1. The printing apparatus 1 shown in FIG. 1 is a multi-function peripheral (MFP) having a plurality of functions such as a printing function, a scanning function, a copying function, and a fax function. For convenience of explanation, an up-down direction, a left-right direction, and a front-rear direction of the printing apparatus 1 are defined as shown by arrows in FIG. 1.

The printing apparatus 1 has an inkjet printing function of recording print data designated by a print job on a sheet P, which is an example of a recording medium, by, for example, ejecting ink. An image printed on the sheet P may be color printable or may be dedicated to monochrome printing. The recording medium is not limited to a sheet medium, and may be a resin medium such as a transparency sheet.

As shown in FIG. 1, the printing apparatus 1 is formed with an opening 20 on a front surface thereof. The opening 20 is provided with a detachable feed tray 21 as an example of an accommodation part and a detachable discharge tray 22 as an example of a discharge unit. The feed tray 21 is a tray that accommodates a plurality of sheets of the sheet P, and includes an open upper surface. In an example shown in FIG. 1, two feed trays 21 are arranged one above the other. The upper feed tray 21 accommodates the sheet P having, for example, an A4 size. The lower feed tray 21 accommodates, the sheet P having, for example, an A3 size.

As shown in FIG. 2, the discharge tray 22 is arranged above the upper feed tray 21. The discharge tray 22 is a tray that accommodates the sheet P, a first sheet P1, and a second sheet P2 discharged by a conveyance roller 64, and includes an open upper surface. In an example shown in FIG. 2, the lower feed tray 21 is not shown for convenience of explanation.

As shown in FIG. 1, the front surface of the printing apparatus 1 is provided with a setting interface 122 including a display screen. The setting interface 122 is configured by, for example, a touch panel, and is capable of performing various printing-related settings of the printing apparatus 1 by a touch operation of a user. The setting interface 122 receives settings of a size of the sheet P and whether to perform a cutting process of cutting the sheet P. Information set by the setting interface 122 is output to a controller 100 (see FIG. 5). The cutting process is an example of a dividing process, which will be described in detail later.

As shown in FIG. 2, the printing apparatus 1 includes a feed roller 23, a first conveyance path R1, conveyance roller pairs 50, 51, 52, and 53, which are examples of conveyors, a first flap 46, a second flap 48, a second conveyance path R2, and a cutter 10, which is an example of the divider.

The conveyance roller pairs are configured by conveyance rollers 60, 62, 64, 68 and driven rollers 61, 63, 65, 69, respectively. The first conveyance path R1 are provided with at least two conveyance roller pairs. The number of the conveyance roller pairs provided on the second conveyance path R2 can be changed as appropriate.

The feed roller 23 is a roller that feeds the sheet P accommodated in the feed tray 21 to a convey start position V of the first conveyance path R1. The feed roller 23 is rotatably supported by a front end of a feed arm 24. The feed arm 24 is rotatably supported by a shaft 25 supported by a frame of the printing apparatus 1. The feed roller 23 is driven by a feed motor 107 shown in FIG. 5 to rotate positively. By the feed roller 23 rotating positively, the sheets P accommodated in the feed tray 21 are fed one by one to the convey start position V of the first conveyance path R1.

The first conveyance path R1 extends upward from a rear end of the feed tray 21, curves in a region partitioned by guide members 41 and 42, passes through a position of an image recording device 3, and extends linearly to the discharge tray 22 in a region partitioned by a guide member 43. In the first illustrative embodiment, a first conveyance direction D1 refers to a direction in which the sheet P passes through a cutting position X of the cutter 10 when the image is recorded on the sheet P by the image recording device 3, that is, a direction from the image recording device 3 toward the cutting position X. A second conveyance direction D2 refers to a direction opposite to the first conveyance direction D1.

The conveyance roller 60 is arranged on an upstream side of the first conveyance direction D1 relative to the image recording device 3 in the first conveyance path R1. The driven roller 61, which is a pinch roller, is arranged at a position facing a lower portion of the conveyance roller 60. The conveyance roller 60 and the driven roller 61 configure the conveyance roller pair 50.

Figure 5:
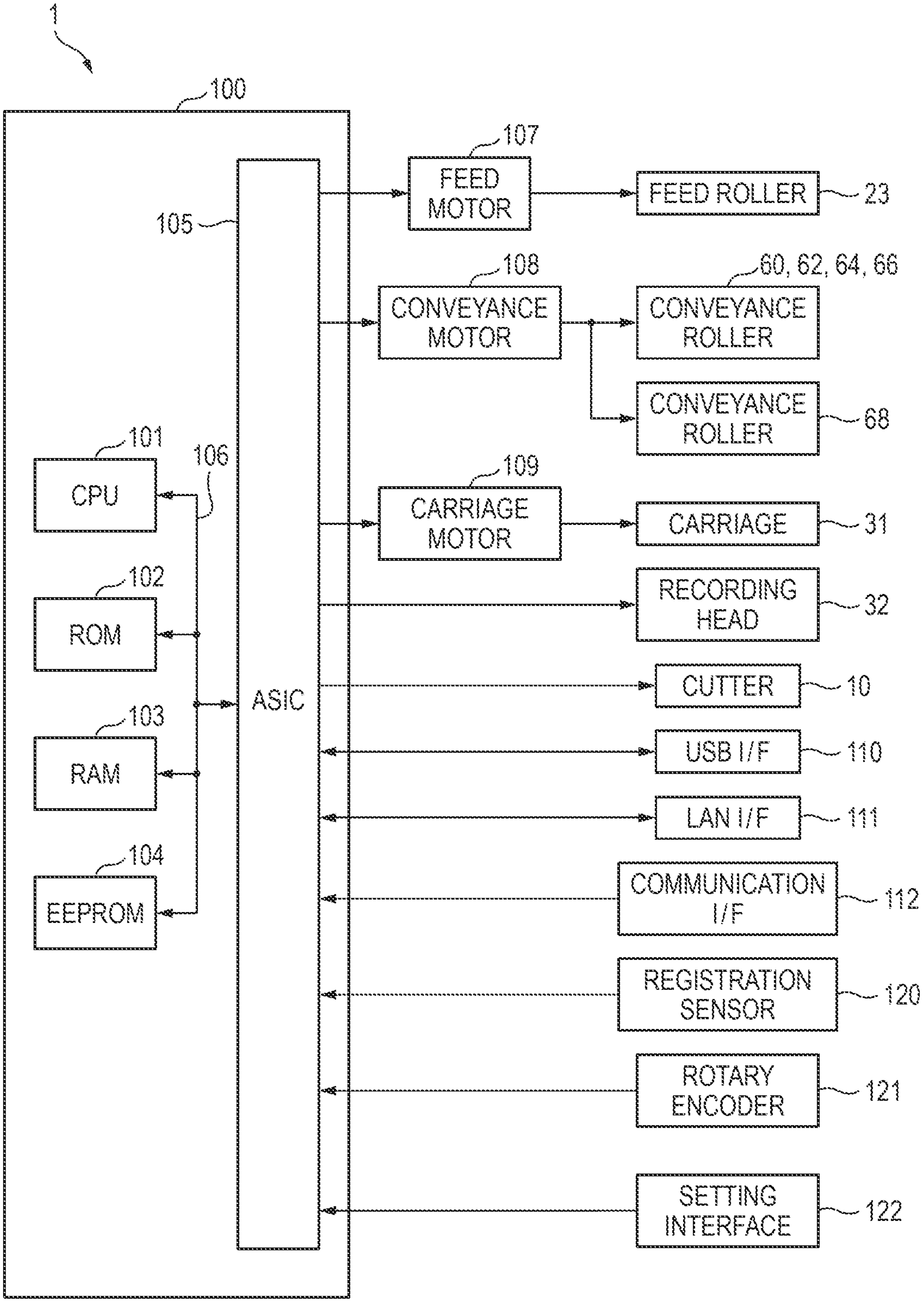
FIG. 5 is a block diagram showing an electrical configuration of the printing apparatus according to the first illustrative embodiment.

The conveyance roller 60 is driven by a conveyance motor 108 shown in FIG. 5. The driven roller 61 rotates as the conveyance roller 60 rotates. The conveyance roller pair 50 is a main conveyor that conveys the sheet P to the image recording device 3. By the conveyance roller 60 and the driven roller 61 rotating positively, the sheet P is sandwiched between the conveyance roller 60 and the driven roller 61 and conveyed to the image recording device 3.

The image recording device 3 is provided between the conveyance roller pair 50 and the conveyance roller pair 51 in the first conveyance path R1, and records the image on the sheet P. The image recording device 3 includes a carriage 31, a recording head 32, nozzles 33, and a platen 34. The recording head 32 is mounted on the carriage 31. A plurality of nozzles 33 are provided on a lower surface of the recording head 32. The recording head 32 ejects ink droplets from the nozzles 33. The platen 34 is a rectangular plate-shaped member on which the sheet P is placed. The image is recorded on the sheet P by the nozzles 33 selectively ejecting ink droplets with the carriage 31 moving with respect to the sheet P supported by the platen 34.

The carriage 31 is driven by a carriage motor 109 shown in FIG. 5 to reciprocate in a direction orthogonal to the first conveyance direction D1, that is, in a width direction of the sheet P. The controller 100 records the image on the sheet P by repeating a recording process and a line feed process. In the recording process, the ink is ejected from the nozzles 33 with the carriage 31 moving in the width direction of the sheet P under a state in which the conveying of the sheet P is stopped, so that one line of the image is recorded on the sheet P. In the line feed process, the conveyance rollers 60 and 62 are driven to convey the sheet P by a predetermined line feed amount.

As shown in FIG. 2, the conveyance roller 62 is arranged on a downstream side of the first conveyance direction D1 relative to the image recording device 3 in the first conveyance path R1. The driven roller 63, which is a gear roller, is arranged so as to face an upper portion of the conveyance roller 62. Here, the gear roller refers to a roller including a plurality of irregularities formed on an outer peripheral surface thereof. The conveyance roller 62 and the driven roller 63 configure the conveyance roller pair 51.

The conveyance roller 62 is driven by the conveyance motor 108 shown in FIG. 5. The driven roller 63 rotates as the conveyance roller 62 rotates. By the conveyance roller 62 and the driven roller 63 rotating positively, the sheet P is sandwiched between the conveyance roller 62 and the driven roller 63, and is conveyed to the downstream side of the first conveyance direction D1.

The conveyance roller 64 is arranged on the downstream side of the first conveyance direction D1 relative to the conveyance roller pair 51 in the first conveyance path R1. The driven roller 65, which is a gear roller, is arranged so as to face an upper portion of the conveyance roller 64. The conveyance roller 64 and the driven roller 65 configure the conveyance roller pair 52. The conveyance roller 64 is driven by the conveyance motor 108. The driven roller 65 rotates as the conveyance roller 64 rotates.

By the conveyance roller 64 and the driven roller 65 rotating positively, the sheet P is sandwiched between the conveyance roller 64 and the driven roller 65 and conveyed to the cutter 10 side. The sheet P, the first sheet P1, and the second sheet P2 are conveyed to the conveyance roller 64 and discharged to the discharge tray 22. By the conveyance roller 64 and the driven roller 65 rotating negatively, the sheet P is sandwiched between the conveyance roller 64 and the driven roller 65, and is conveyed to the second conveyance path R2 along a lower surface of the first flap 46.

The first flap 46 is provided between the conveyance roller pair 50 and the conveyance roller pair 51 in the first conveyance path R1. The first flap 46 is arranged near a branch position Y facing the guide member 43. The first flap 46 is rotatably supported by the platen 34 between a first state and a second state. In the first state shown by a solid line in FIG. 2, the first flap 46 comes into contact with the guide member 43 and closes the first conveyance path R1. In the second state shown by a dotted line in FIG. 2, the first flap 46 is located below the first state and allows the sheet P conveyed in the first conveyance direction D1 to pass away from the guide member 43.

The first flap 46 is urged upward by a coil spring 47. One end of the coil spring 47 is connected to the first flap 46, and the other end thereof is connected to the platen 34. The first flap 46 is in the first state by being urged by the coil spring 47, and a front end thereof comes into contact with the guide member 43.

The cutter 10 is a well-known cutter mechanism, includes a pair of blades consisting of an upper blade and a lower blade, and a cutter carriage, and cuts the sheet P by the upper and lower blades. Specifically, the cutter 10 cuts the sheet P at a cutting position CL, which is an example of a dividing position, in the width direction of the sheet P by the upper and lower blades by moving the cutter carriage in the width direction of the sheet P (see FIG. 6). The cutting position X of the cutter 10 is a position where the sheet P is cut by the upper and lower blades.

The upper and lower blades are both circular round blades. In this case, both the upper and lower round blades are provided in the cutter carriage. One of the upper and lower blades may be a fixed blade, and the other one thereof may be a round blade. In this case, the round blade is provided in the cutter carriage, and the fixed blade is fixed to the frame of the printing apparatus 1.

The cutter 10 may not include the cutter carriage. In this case, the cutter 10 includes fixed blades extending in a direction intersecting the first conveyance direction D1 above and below the first conveyance path R1, respectively. The cutter 10 cuts the sheet P at the cutting position CL in the width direction by moving the upper fixed blade and the lower fixed blade so that these fixed blades come close to each other. The cutter 10 may have only one of the upper blade and the lower blade.

The cutter 10 is arranged above the discharge tray 22 in a height direction of the printing apparatus 1, and is arranged on the discharge tray 22 side relative to the conveyance roller pairs 50, 51, and 52 in the first conveyance direction D1 of the printing apparatus 1. That is, no conveyance roller pair is provided on the downstream side of the first conveyance direction D1 relative to the cutter 10. The cutter 10 is arranged between the discharge tray 22 and the conveyance roller pair 52 that discharges the sheet P to the discharge tray 22. No guide member that forms the first conveyance path R1 is provided on the downstream side of the first conveyance direction D1 relative to the cutter 10. The cutter 10 cuts the sheet P in a state where the sheet P is discharged to the discharge tray 22 by the conveyance roller pair 52.

The cutter 10 is arranged such that a distance LX in the first conveyance direction D1 from a position of a rotation axis of the conveyance roller 60 to the cutting position X of the cutter 10 is shorter than half a length L of the feed tray 21 in the first conveyance direction D1. Here, the length L of the feed tray 21 in the first conveyance direction D1 refers to a length from a front inner wall surface to a rear inner wall surface of the feed tray 21.

Figure 6:
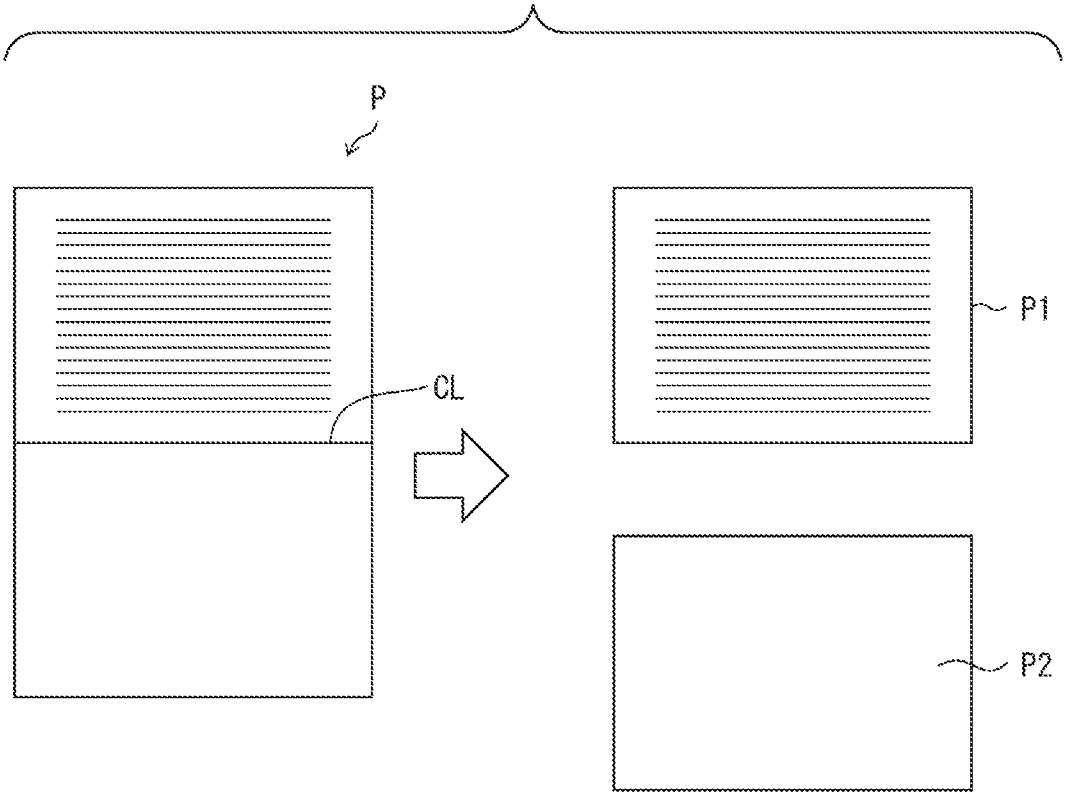
FIG. 6 is a diagram showing the sheet before division and a first sheet and a second sheet after division.

FIG. 6 is a diagram showing a sheet before cutting and a first sheet and a second sheet after cutting. As shown in FIG. 6, the cutter 10 cuts the sheet P to divide the sheet P into the first sheet P1, which is a first recording medium, and the second sheet P2, which is a second recording medium.

As shown in FIG. 2, the second flap 48 is rotatably arranged at a merging position W of the first conveyance path R1 and the second conveyance path R2. Specifically, the second flap 48 is rotatable between a first state shown by a solid line in FIG. 2 and a second state shown by a dotted line in FIG. 2. When the second flap 48 is in the first state, the second flap 48 and the guide member 42 configure a part of the second conveyance path R2. When the second flap 48 is in the second state, the second flap 48 and the guide member 41 configure a part of the first conveyance path R1.

A registration sensor 120 is provided upstream of the conveyance roller pair 50 in the first conveyance path R1. The registration sensor 120 is a sensor that detects that a leading end or a trailing end of the sheet P passes through a contact position with the conveyance roller 60. The registration sensor 120 may be a sensor provided with an actuator that swings when coming into contact with the sheet P, an optical sensor, or the like.

The registration sensor 120 outputs an on signal when the sheet P passes through a position of the registration sensor 120, and outputs an off signal when the sheet P does not pass through the position of the registration sensor 120. That is, the on signal is output from a timing when the leading end of the sheet P reaches the position of the registration sensor 120 to a timing when the trailing end of the sheet P passes the position of the registration sensor 120, and the off signal is output during other times. A detection signal is output from the registration sensor 120 to the controller 100.

The conveyance roller 60 is provided with a rotary encoder 121 that detects rotation of the conveyance roller 60. The rotary encoder 121 outputs a pulse signal to the controller 100 according to the rotation of the conveyance roller 60 (see FIG. 5). The rotary encoder 121 includes an encoder disk and an optical sensor. The encoder disk rotates with the rotation of the conveyance roller 60. The optical sensor reads the rotating encoder disk, generates a pulse signal, and outputs the generated pulse signal to the controller 100.

The second conveyance path R2 is a path partitioned by guide members 71, 72, 73, the conveyance roller pair 53, and the like. The conveyance roller 68 and the driven roller 69, which is a pinch roller, configure the conveyance roller pair 53. The second conveyance path R2 branches from the branch position Y on an upstream side of the first conveyance path R1 relative to the conveyance roller pair 52, and is connected to the merging position W on the upstream side of the first conveyance direction D1 relative to the image recording device 3 in the first conveyance path R1.

By negatively rotating the conveyance roller 64 and rotating the conveyance roller 68 by the controller 100, the sheet P on which the image is recorded on one side can be conveyed along the second conveyance direction D2 in the second conveyance path R2, and then conveyed to the first conveyance path R1 with front and back sides inverted once. In this way, the image recording device 3 can print on both sides of the sheet P.

Configuration of Conveyance Roller Pair

Figure 3:
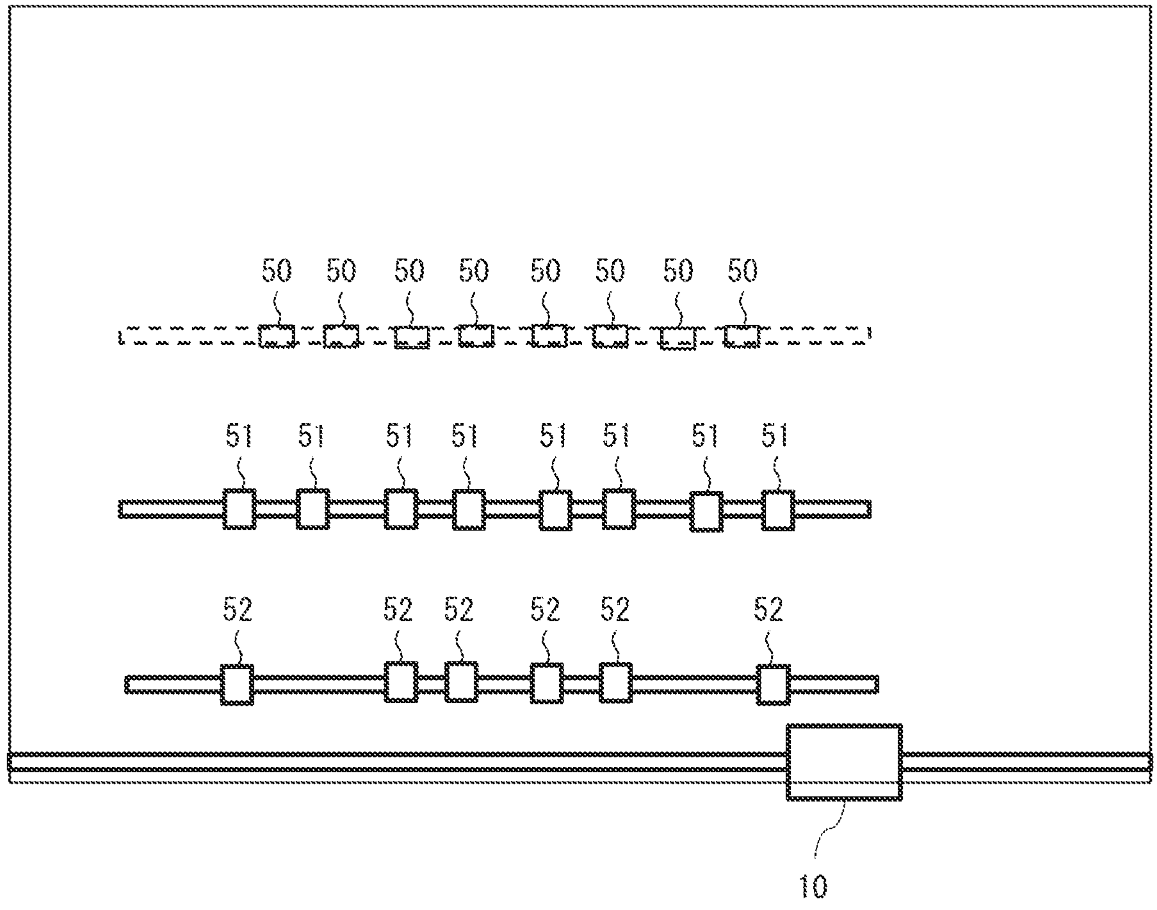
FIG. 3 is a diagram schematically showing conveyance roller pairs in a first conveyance path of the printing apparatus according to the first illustrative embodiment.
Figure 4:
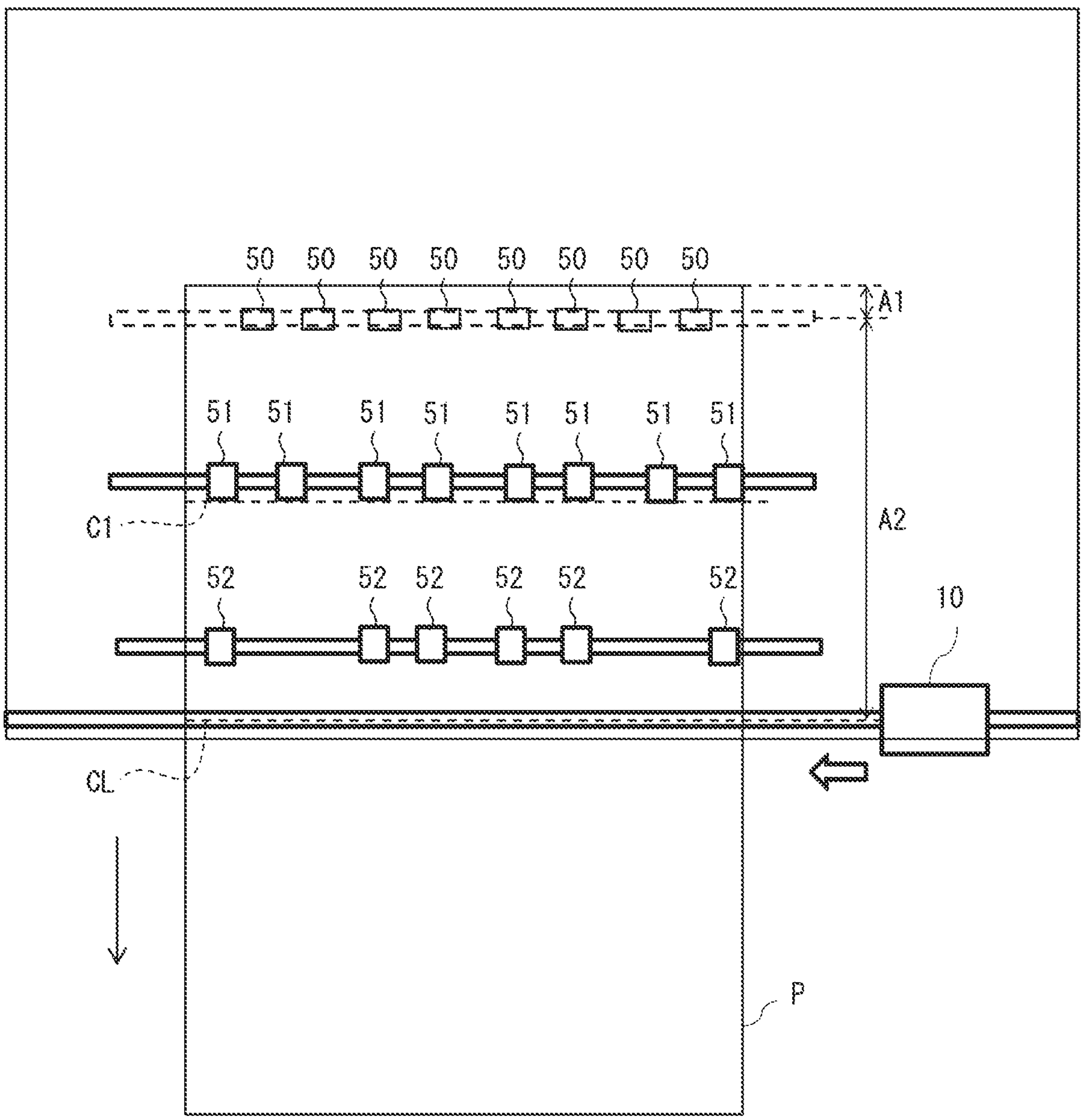
FIG. 4 is a diagram showing a positional relation between the conveyance roller pairs and a sheet when the sheet is divided in the printing apparatus according to the first illustrative embodiment.

FIG. 3 is a diagram schematically showing the conveyance roller pairs in the first conveyance path R1 of the printing apparatus 1 according to the first illustrative embodiment. FIG. 4 is a diagram showing a positional relation between the conveyance roller pairs and the sheet when the sheet is cut in the printing apparatus 1 according to the first illustrative embodiment.

As shown in FIG. 3, the first conveyance path R1 is provided with eight conveyance roller pairs 50, eight conveyance roller pairs 51, and six conveyance roller pairs 52. A plurality of the conveyance roller pairs 50, 51, and 52 are provided along the width direction of the sheet P. The plurality of conveyance roller pairs 50, 51, and 52 are provided so as to be line-symmetrical with respect to a central position in the width direction of the sheet P. Rotation axes of the conveyance rollers 60, 62, and 64 extend in the width direction of the sheet P. A roller pair number of the conveyance roller pairs 50, which are the main conveyors, is the largest. This is because the conveyance roller pairs 50 require the largest convey force. A roller pair number of each of the conveyance roller pairs 50, 51, and 52 can be changed as appropriate.

The driven rollers 61, 63, and 65 are urged to the conveyance rollers 60, 62, and 64 by urging members (for example, springs) (not shown). When the sheet P is cut, the eight conveyance roller pairs 50 shown in FIG. 4 each hold the sheet P with a load of 4.0 [N]. The eight conveyance roller pairs 51 each hold the sheet P with a load of 0.7 [N]. The six conveyance roller pairs 52 each hold the sheet P with a load of 0.4 [N]. The loads of the conveyance roller pairs 50, 51, and 52 for holding the sheet P are not limited to the above, and can be changed as appropriate.

As shown in FIG. 4, when the sheet P is cut, the sheet P is cut by the cutter 10 in a state of being held by the conveyance roller pairs 50, 51, and 52. The cutting position CL of the sheet P corresponds to the cutting position X of the cutter 10. In this case, the conveyance roller pairs 50, 51, and 52 hold the second sheet P2 of the sheet P.

Here, assuming that in the first conveyance direction D1, a distance from a center of the rotation axis of the conveyance roller 60 to the trailing end of the sheet P is A1, and a distance from the center of the rotation axis of the conveyance roller 60 to the cutting position CL of the sheet P is A2, the conveyance roller pairs 50 hold the sheet P such that A1<A2. The conveyance roller pairs 50 hold an upstream side of the second sheet P2 of the sheet P relative to a central position Cl in the first conveyance direction D1. That is, the conveyance roller pairs 50 hold the sheet P at a position close to the trailing end of the sheet P.

The conveyance roller pairs 52 hold a downstream side of the second sheet P2 of the sheet P relative to the central position C 1 in the first conveyance direction D1. That is, the conveyance roller pairs 52 hold the sheet P at a position close to the cutting position CL of the sheet P. The conveyance roller pairs 51 hold the second sheet P2 of the sheet P at a position near the central position Cl in the first conveyance direction D1.

Electrical Configuration of Printing Apparatus

FIG. 5 is a block diagram showing an electrical configuration of the printing apparatus 1 according to the first illustrative embodiment. As shown in FIG. 5, in addition to the above-mentioned elements, the printing apparatus 1 includes the feed motor 107, the conveyance motor 108, the carriage motor 109, the controller 100, a USB interface (I/F) 110, a LAN interface (I/F) 111, and a communication interface (I/F) 112.

The controller 100 includes a central processing unit (CPU) 101, a read only memory (ROM) 102, a random access memory (RAM) 103, an EEPROM 104 (registered trademark), and an ASIC 105, which are connected with each other by an internal bus 106. The ROM 102 stores programs for the CPU 101 to control various operations and the like. The RAM 103 is used as a storage area that temporarily records data, signals, and the like used by the CPU 101 when executing the above programs, or as a work area for data processing. The EEPROM 104 stores setting information that should be retained even after being deenergized. The controller 100 controls, based on control programs read from the ROM 102, the feed motor 107, the conveyance motor 108, the carriage motor 109, the recording head 32, the cutter 10, and the like.

The ASIC 105 is connected to the feed motor 107, the conveyance motor 108, the carriage motor 109, the recording head 32, the cutter 10, the USB interface (I/F) 110, the LAN interface (I/F) 111, the communication interface (I/F) 112, the registration sensor 120, the rotary encoder 121, and the setting interface 122. The ASIC 105 supplies a drive current to the feed motor 107, the conveyance motor 108, and the carriage motor 109. The controller 100 controls rotation of the feed motor 107, the conveyance motor 108, and the carriage motor 109 by, for example, pulse width modulation (PWM) control.

The controller 100 controls the nozzles 33 to eject ink droplets by applying a drive voltage to a vibrating element of the recording head 32. The registration sensor 120 and the rotary encoder 121 are connected to the ASIC 105. Then, the controller 100 detects a state of the printing apparatus 1 based on signals output from the registration sensor 120 and the rotary encoder 121.

Specifically, the controller 100 detects that the sheet P passes the contact position with the conveyance roller 60 based on a detection signal output from the registration sensor 120. The controller 100 detects a rotation amount of the conveyance roller 60 based on a pulse signal output from the rotary encoder 121. The controller 100 estimates a convey amount of the sheet Pin the first conveyance path R1 based on a pulse signal output from the rotary encoder 121 after an ON signal is output from the registration sensor 120.

The USB interface (I/F) 110 is connected with a USB memory, a USB cable, and the like. The LAN interface 111 is connected to a PC via a LAN cable. The controller 100 receives a print job via the USB interface 110 or the LAN interface 111, and then records print data designated by the print job on the sheet P by controlling each element (unit) of the printing apparatus 1.

Flow of Control by Controller

Figure 7:
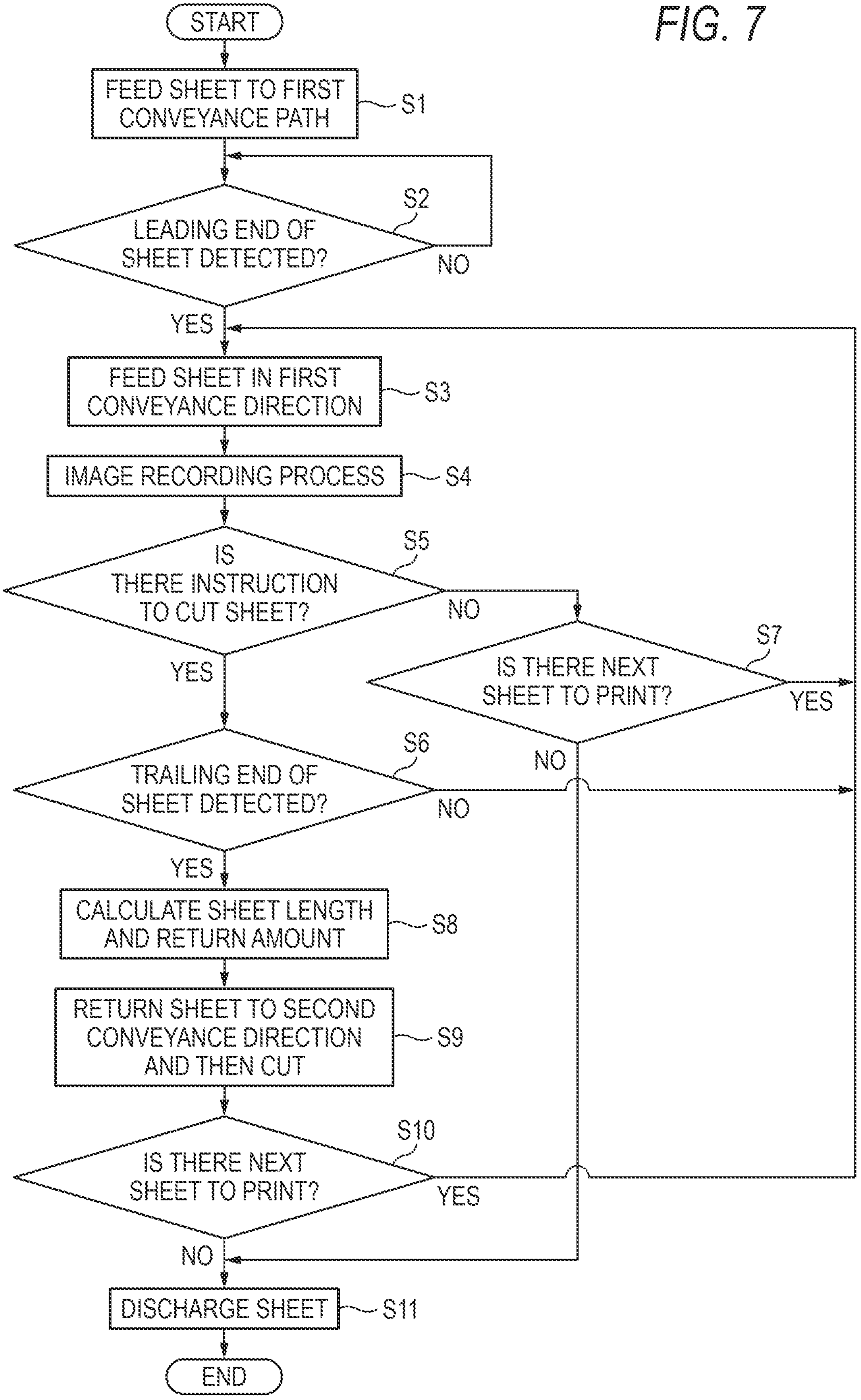
FIG. 7 is a flowchart showing a flow of control by a controller of the printing apparatus according to the first illustrative embodiment.

Next, a flow of control by the controller 100 of the printing apparatus 1 according to the first illustrative embodiment will be described with reference to a flowchart of FIG. 7. FIG. 7 is a flowchart showing the flow of control by the controller 100 of the printing apparatus 1 according to the first illustrative embodiment.

First, when receiving a print job via the communication I/F 112, the controller 100 drives the feed motor 107 to positively rotate the feed roller 23 to take out the sheet P from the feed tray 21, and start conveying the sheet P (51). Specifically, the sheet P is conveyed from the feed tray 21 to the first conveyance path R1.

Subsequently, the controller 100 determines whether the leading end of the sheet P is detected by using a detection result of the registration sensor 120 (S2). If the leading end of the sheet P is not detected (S2: NO), If the controller 100 returns to S1, and if the leading end of the sheet P is detected (S2: YES), the controller 100 conveys the sheet P to the image recording device 3 (S3). The controller 100 controls the image recording device 3, and the image recording device 3 starts recording an image on the sheet P conveyed to the image recording device 3 (S4).

In S4, the controller 100 records the image on the sheet P by performing an image recording process of alternately repeating the line feed process and the recording process shown below on the sheet P conveyed to the image recording device 3. That is, in line feed process, the controller 100 positively rotates the conveyance motor 108 to drive the conveyance rollers 60, 62, and 64, thereby conveying the sheet P in the first conveyance direction D1 by a predetermined convey amount. In the recording process, when the conveying of the sheet P is stopped, the controller 100 drives the carriage motor 109 to move the carriage 31 in the width direction of the sheet P, and then records the image for one line by ejecting ink droplets from the nozzles 33 of the recording head 32 to the sheet P.

After S4, the controller 100 determines whether the setting interface 122 is set to perform the cutting process (S5). If the cutting process is set to be performed (S5: YES), the controller 100 determines whether the trailing end of the sheet P is detected (S6). If the cutting process is not set to be performed (S5: NO), the controller 100 determines whether the print job has a next page (S7). If there is no next page (S7: NO), the controller 100 discharges the sheet P to the discharge tray 22 (S11), and if there is a next page (S7: YES), the controller 100 returns to S3.

In S6, the controller 100 determines whether the registration sensor 120 detects the trailing end of the sheet P (S6). If the registration sensor 120 does not detect the trailing end of the sheet P (S6: NO), the controller 100 returns to S3, and if the registration sensor 120 detects the trailing end of the sheet P (S6: YES), the controller 100 calculates a length of the sheet P and sets a return amount of the sheet P according to the cutting position X of the cutter 10 (S8).

Specifically, the controller 100 calculates a length A of the sheet P in the first conveyance direction D1 based on a convey amount of the sheet P detected by the rotary encoder 121 between a time when the registration sensor 120 detects the leading end of the sheet P and a time when the registration sensor 120 detects the trailing end of the sheet P. Then, the controller 100 calculates the cutting position CL of the sheet P shown in FIG. 6 based on the calculated length A of the sheet P in the first conveyance direction D1, and sets a convey amount in the second conveyance direction D2 from the cutting position CL of the sheet P to the cutting position X of the cutter 10. After S8, the controller 100 conveys the sheet P in the second conveyance direction based on the convey amount of the sheet P in the second conveyance direction set in S8, and cuts the sheet P in the cutter 10 (S9).

Subsequently, the controller 100 determines whether the print job has a next page (S10). If there is no next page (S10: NO), the controller 100 discharges the sheet P to the discharge tray 22 (511), and if there is a next page (S10: YES), the controller 100 returns to S3. Up to this step, the flowchart shown in FIG. 7 ends.

According to the printing apparatus 1 according to the first illustrative embodiment described above, when the cutter 10 performs the cutting process (S9) on the sheet P, by holding the upstream side of the sheet P relative to the central position in the first conveyance direction D1, that is, the second sheet P2, by two or more conveyance roller pairs 50, 51, and 52, positional displacement of the sheet P can be prevented. Further, since no conveyance roller pair is provided on the downstream side in the first conveyance direction D1 relative to the cutter 10, the printing apparatus 1 can be compact.

When the cutting process (S9) is performed, a side of the sheet P that is closest to the cutter 10 is held by the conveyance roller pairs 52 each including the driven roller 65, which is a gear roller having an outer peripheral surface formed with a plurality of irregularities. By holding the sheet P by the driven roller 65 having a large frictional resistance in this way, it is possible to effectively prevent the sheet P from being displaced (laterally displaced) during the cutting process (S9). Further, by reducing a contact area between the driven roller 65 and the sheet P, it is possible to prevent the ink from adhering to the sheet P and prevent a print quality from deteriorating.

By maximizing the load for holding the sheet P of the conveyance roller pairs 50, which are the main conveyors, a rotational moment generated in the sheet P due to movement of the cutter 10 can be effectively received and canceled by the conveyance roller pairs 50. Therefore, the positional displacement of the sheet P can be reliably prevented.

Since a plurality of conveyance roller pairs 50 are provided along the width direction of the sheet P, the sheet P can be stably held. Since the roller pair number of the conveyance roller pairs 50, which are the main conveyors, is equal to or more than those of the conveyance roller pairs 51 and 52, the positional displacement of the sheet P due to the large rotational moment acting on the sheet P during the cutting process (S9) can be effectively prevented.

By holding the downstream side of the second sheet P2 in the first conveyance direction D1 by the conveyance roller pairs 50, which are the main conveyors, the rotational moment and twist of the sheet P generated during the cutting process (S9) can be effectively received and canceled by the conveyance roller pairs 50.

The distance LX in the first conveyance direction D1 from the conveyance roller 60 to the cutting position X of the cutter 10 is shorter than half the length L of the feed tray 21 in the first conveyance direction D1. By shortening a distance between the conveyance roller pairs 50 and the cutter 10 in this way, a size of the printing apparatus 1 in the front-rear direction can be reduced, and the printing apparatus 1 can be compact.

The conveyance roller pairs 50, which are the main conveyors and are arranged so as to be closest to the upstream side of the first conveyance direction D1 relative to the image recording device 3, are set to have a large convey force, and thus have a large holding force for the sheet P. By holding the sheet P using the conveyance roller pairs 50 having the large holding force, the positional displacement of the sheet P can be more reliably prevented.

Modification 1

In the above-mentioned printing apparatus 1, the sheet P is divided into a plurality of pieces by being cut by the cutter 10, but the present disclosure is not limited thereto. Instead of the cutter 10, the printing apparatus 1 may include a machining device that performs perforation formation on the sheet P as an example of the divider. In this case, the controller 100 performs a process on the sheet P by the machining device to perform the perforation formation at a processing position, which is an example of the dividing position of the sheet P. The processing position is the same as the cutting position CL.

Specifically, the machining device includes a perforation cutter and the cutter carriage described above. The perforation cutter includes a disk formed with blades at equal intervals on a circumference thereof. The machining device moves the cutter carriage in the width direction of the sheet P, and forms perforations on the sheet P by forming a plurality of notches at intervals along the processing position of the sheet P by the perforation cutter.

Modification 2

Figure 8A:
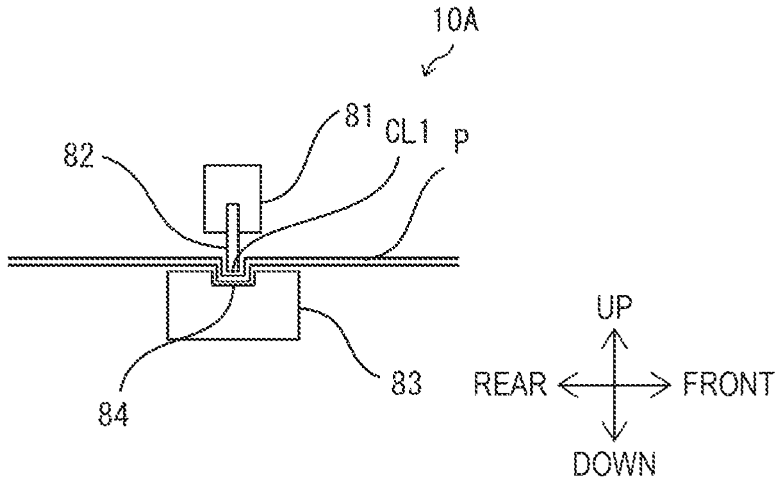
FIGS. 8A and 8B are diagram showing modified examples of a cutter of the printing apparatus according to the first illustrative embodiment.
Figure 8B:
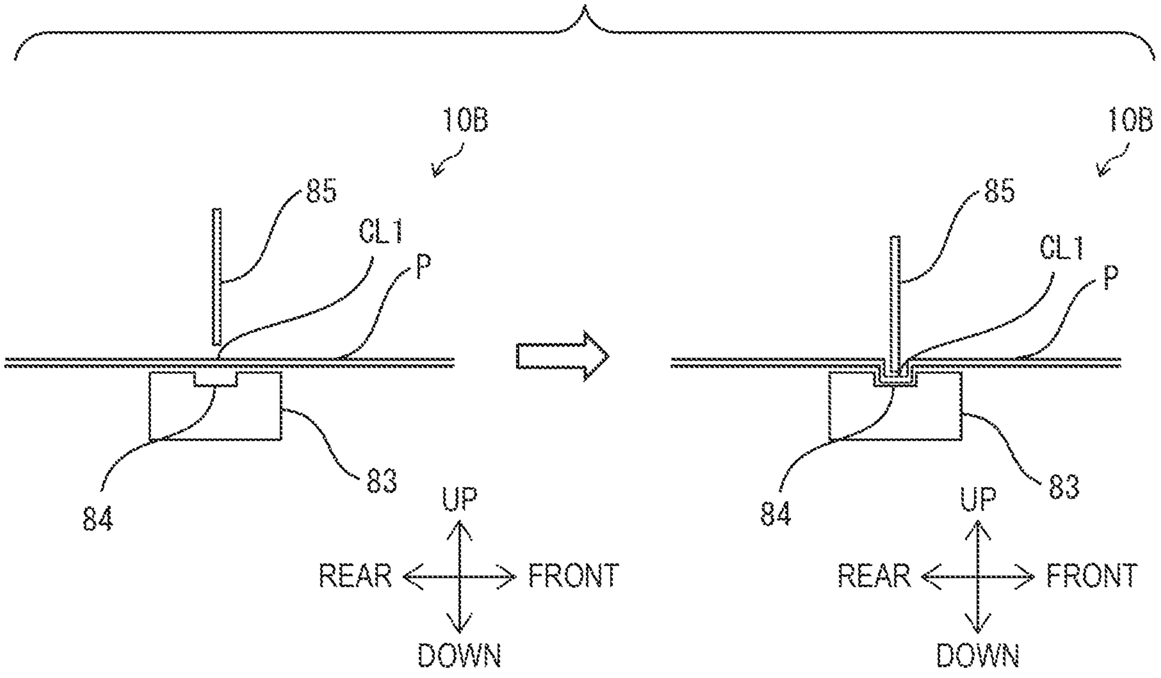

FIGS. 8A and 8B are diagrams showing configurations of machining devices 10A and 10B, which are modified examples of the cutter of the printing apparatus according to the first illustrative embodiment. Instead of the cutter 10, the printing apparatus 1 may include, as an example of the divider, a machining device 10A that performs crease formation on the sheet P as shown in FIG. 8A. In this case, the controller 100 controls the machining device 10A to perform a process of performing the crease formation at a processing position CL1 of the sheet P.

The machining device 10A includes a cutter carriage 81, a blade 82, and a holding member 83. The blade 82 is a round blade and is provided on the cutter carriage 81. The blade 82 is formed so as not to cut the sheet P even if the blade 82 comes into contact with the sheet P. The holding member 83 is formed with a recess 84, and the recess 84 is arranged at a position facing the blade 82. The machining device 10A pushes the sheet P against the recess 84 by the blade 82 by moving the cutter carriage 81 in the width direction of the sheet P. In this way, a crease is formed along the processing position CL1 of the sheet P.

Instead of the cutter 10, the printing apparatus 1 may include a machining device 10B shown in FIG. 8B as an example of the divider. The machining device 10B includes the holding member 83 and an extrusion member 85. The extrusion member 85 is used for extruding the sheet Pin a downward direction of the printing apparatus 1 at the processing position CL1, and is, for example, a rectangular blade formed so as to extend in the left-right direction of the printing apparatus 1 and not cut the sheet P even if the extrusion member 85 comes into contact with the sheet P. The recess 84 formed in the holding member 83 is arranged at a position facing the extrusion member 85.

By moving the extrusion member 85 in the downward direction of the printing apparatus 1, the machining device 10B brings the extrusion member 85 into contact with the sheet P along the processing position CL1, so as to extrude the sheet Pin the downward direction of the printing apparatus 1 at the processing position CL1. The machining device 10B forms a crease at the processing position CL1 of the sheet P by holding the sheet P extruded by the extrusion member 85 by the recess 84 of the holding member 83.

Second Illustrative Embodiment

Next, a printing apparatus 1A according to a second illustrative embodiment of the present disclosure will be described with reference to FIG. 9. For convenience of explanation, the same reference numerals will be added to members having the same functions as the members described in the above-described first illustrative embodiment, and description thereof will not be repeated.

Configuration of Printing Apparatus

Figure 9:
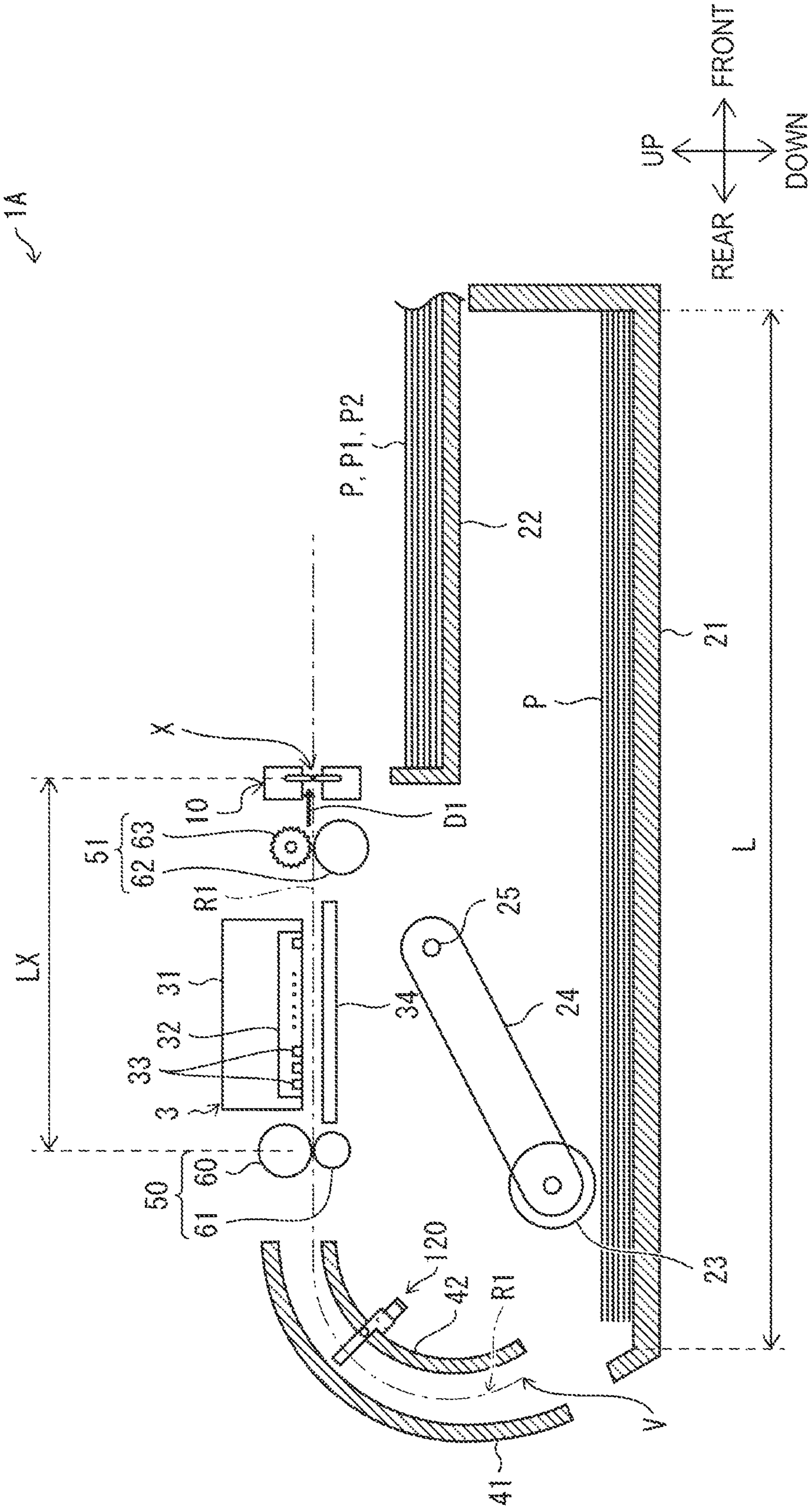
FIG. 9 is a cross-sectional diagram showing an internal structure of the printing apparatus according to a second illustrative embodiment.

FIG. 9 is a cross-sectional diagram showing an internal structure of the printing apparatus 1A according to the second illustrative embodiment. As shown in FIG. 9, the printing apparatus 1A of the second illustrative embodiment is different from the printing apparatus 1 of the first illustrative embodiment in that the first conveyance path R1 is not provided with the conveyance roller pairs 52 and the second conveyance path R2 is not provided. That is, unlike the printing apparatus 1 of the first illustrative embodiment, the printing apparatus 1A—of the second illustrative embodiment does not perform double-sided printing.

As shown in FIG. 9, the printing apparatus 1A includes the feed tray 21, the discharge tray 22, the feed roller 23, the first conveyance path R1, conveyance roller pairs 50 and 51, the image recording device 3, and the cutter 10.

The first conveyance path R1 extends upward from the rear end of the feed tray 21, curves in the region partitioned by guide members 41 and 42, passes through the position of the image recording device 3, and extends linearly to the discharge tray 22 in a region partitioned by guide members 44 and 45.

The conveyance roller 60 is arranged on the upstream side of the first conveyance direction D1 relative to the image recording device 3 in the first conveyance path R1. The driven roller 61 is arranged at the position facing the lower portion of the conveyance roller 60. The conveyance roller 60 and the driven roller 61 configure the conveyance roller pair 50. The conveyance roller 60 is driven by the conveyance motor 108 (see FIG. 5). The driven roller 61 rotates as the conveyance roller 60 rotates. By the conveyance roller 60 and the driven roller 61 rotating positively, the sheet P is sandwiched between the conveyance roller 60 and the driven roller 61 and conveyed to the image recording device 3.

The conveyance roller 62 is arranged on the downstream side of the first conveyance direction D1 relative to the image recording device 3 in the first conveyance path R1. The driven roller 63 is arranged so as to face the upper portion of the conveyance roller 62. The conveyance roller 62 and the driven roller 63 configure the conveyance roller pair 51. The conveyance roller 62 is driven by the conveyance motor 108 (see FIG. 5). The driven roller 63 rotates as the conveyance roller 62 rotates.

By the conveyance roller 62 and the driven roller 63 rotating positively, the sheet P is sandwiched between the conveyance roller 64 and the driven roller 65 and conveyed to the cutter 10. The sheet P, the first sheet P1, and the second sheet P2 are conveyed to the conveyance roller 64 and discharged to the discharge tray 22.

The cutter 10 is arranged downstream of the conveyance roller pairs 50 and 51 in the first conveyance direction D1. That is, no conveyance roller pair is provided on the downstream side of the first conveyance direction D1 relative to the cutter 10. The cutter 10 cuts the sheet P discharged to the discharge tray 22 by the conveyance roller pair 51.

The cutter 10 is arranged such that the distance LX in the first conveyance direction D1 from the position of the rotation axis of the conveyance roller 60 to the cutting position X of the cutter 10 is shorter than half the length L of the feed tray 21 in the first conveyance direction D1. Here, the length L of the feed tray 21 in the first conveyance direction D1 refers to a length from the front inner wall surface to the rear inner wall surface of the feed tray 21.

In the printing apparatus 1A of the second illustrative embodiment described above, when the sheet P is cut, the sheet P may be held by the conveyance roller pairs 50 and 51, so that the conveyance roller pair 52 does not need to be provided as in the printing apparatus 1 of the first illustrative embodiment. In this case, there is provided a compact printing apparatus that has a more simple structure and prevents the positional displacement of the recording medium when the recording medium is cut by the cutter.

Other Illustrative Embodiments

In the printing apparatuses 1 and 1A of the above-described first and second illustrative embodiments, the type of the recording medium on which the image is recorded may be selected by an operation of the user, and the load for holding the recording medium of the conveyor may be changed according to the type of the selected recording medium.

For example, when the controller 100 receives a print job via the communication I/F 112, which is a receiver, the controller 100 determines whether a special sheet, which is an example of a special type recording medium, is selected. When the special sheet is selected, the controller 100 increases the load for holding the special sheet of the conveyance roller pairs 50, 51, and 52 as compared with a case of holding an ordinary sheet. Here, the special sheet refers to a thick sheet having a thickness different from that of the ordinary sheet, a glossy sheet having different characteristics, or the like. In this way, by changing the load for holding the recording medium of the conveyor according to the type of the recording medium, it is possible to prevent the recording medium from being displaced during the cutting process regardless of the type of the recording medium.

The conveyance roller pairs 50, 51, and 52 may hold different types of the sheet P with different holding loads depending on the characteristics of the sheet P. For example, when two feed trays 21 accommodate an ordinary sheet (ordinary type recording medium) as the sheet P and the special sheet (special type recording medium) having characteristics different from those of the ordinary sheet, a load for holding the special sheet may be larger than that for holding the ordinary sheet. Specifically, when the sheet P is a thick sheet, which is an example of the special sheet, an urging force of springs that urge the driven rollers 61, 63, and 65 toward the conveyance rollers 60, 62, and 64 increases.

Although the printing apparatuses 1 and 1A of the above-described first and second illustrative embodiments are serial inkjet printers, the present disclosure is not limited thereto, and for example, a line inkjet printer may be used. A printing method is not limited to an inkjet method, and may be an electrophotographic method.

Although the printing apparatuses 1 and 1A of the above-described first and second illustrative embodiments are provided with two feed trays 21, the present disclosure is not limited thereto, and for example, one feed tray 21 may be arranged. The sheet P is conveyed by using the conveyance rollers 60, 62, 64, and 68, which are roller members, but the present disclosure is not limited thereto, and drum members may be used.

The controller 100 receives the print job via the USB interface 110 or the LAN interface 111, but the present disclosure is not limited thereto, and the print job may be received via wireless communication.

In the printing apparatuses 1 and 1A of the above-described first and second illustrative embodiments, the controller 100 cuts the sheet Pin the width direction by the cutter 10 in the state where the sheet P is stopped, but the present disclosure is not limited thereto. For example, the sheet P may be cut in a state where the sheet P is conveyed at a slower speed than usual.

In the printing apparatuses 1 and 1A of the above-described first and second illustrative embodiments, when the sheet P is cut, the sheet P is held by the conveyance roller pairs, but the present disclosure is not limited thereto. The sheet P may be held by the conveyance rollers and the guide members.

The present invention is not limited to the above-described illustrative embodiments, and various modifications can be made within the scope of the present disclosure. The technical scope of the present invention also includes illustrative embodiments obtained by appropriately combining technical means disclosed in the different illustrative embodiments.

What is claimed is:

1. A printing apparatus comprising:

a plurality of conveyors configured to convey a recording medium in a conveyance direction;

an image recording device configured to record an image on the recording medium;

a divider disposed downstream of the conveyors and the image recording device in the conveyance direction, the divider being configured to perform a dividing process comprising dividing the recording medium into a plurality of pieces; and a controller configured to bring the divider into contact with the recording medium to perform the dividing process on the recording medium with holding an upstream side relative to a central position of the recording medium in the conveyance direction by at least two or more of the plurality of conveyors.

2. The printing apparatus according to claim 1, further comprising:

a discharge tray, the recording medium having the image recorded thereon by the image recording device being discharged to the discharge tray, wherein the divider is disposed between the discharge tray and at least one of the conveyors that is configured to discharge the recording medium to the discharge tray in the conveyance direction.

3. The printing apparatus according to claim 2, wherein the divider is disposed at a position above the discharge tray in a height direction of the printing apparatus and closer to the discharge tray than the conveyors of the printing apparatus in the conveyance direction.

4. The printing apparatus according to claim 2, wherein the controller is configured to cause the divider to perform the dividing process on the recording medium that is being discharged to the discharge tray by the conveyors.

5. The printing apparatus according to claim 1, wherein the controller is configured to cause the divider to perform the dividing process on the recording medium by moving the divider in a width direction of the recording medium.

6. The printing apparatus according to claim 1, wherein the plurality of conveyors comprises a first conveyor that is the closest to the divider in the conveyance direction among the plurality of conveyors, the first conveyor includes at least one roller having an outer peripheral surface formed with a plurality of irregularities.

7. The printing apparatus according to claim 1, wherein the plurality of conveyors comprises a main conveyor that is the farthest from the divider in the conveyance direction among the plurality of conveyors holding the recording medium when the divider performs the dividing process, the main conveyor being configured to hold the recording medium with a load larger than those of other conveyors included in the plurality of conveyors.

8. The printing apparatus according to claim 7, wherein the conveyors include a plurality of roller pairs provided along the width direction of the recording medium and facing each other, and wherein a roller pair number of the main conveyor is equal to or greater than roller pair numbers of other conveyors.

9. The printing apparatus according to claim 7, wherein the divider is disposed at a dividing position and is configured to divide the recording medium into a first recording medium and a second recording medium at the dividing position, and wherein the main conveyor is disposed on an upstream side of the second recording medium relative to a central position in the conveyance direction in a state a divided position on the recording medium corresponds to the dividing position of the divider.

10. The printing apparatus according to claim 7, further comprising:

an accommodation part configured to accommodate the recording medium, wherein a distance between the main conveyor and the divider in the conveyance direction is half or less of a length of the accommodation part in the conveyance direction.

11. The printing apparatus according to claim 7, wherein the main conveyor is disposed at a position upstream of the image recording device in the conveyance direction and closest to the image recording device in the conveyance direction among the plurality of conveyors.

12. The printing apparatus according to claim 1, wherein the recording medium includes an ordinary type recording medium and a special type recording medium having characteristics different from those of the ordinary recording medium, and wherein the conveyors are configured to hold different types of the recording medium with different holding loads depending on the characteristics of the recording medium.

13. A printing apparatus comprising:

a plurality of conveyors configured to convey a recording medium in a conveyance direction;

an image recording device configured to record an image on the recording medium;

a machining device disposed downstream of the conveyors and the image recording device in the conveyance direction, the machining device being configured to perform one of (i) cutting, (ii) perforation formation, and (iii) crease formation on the recording medium; and a controller configured to control the machining device to perform one of the (i) cutting, (ii) perforation formation, and (iii) crease formation with holding an upstream side relative to a central position of the recording medium in the conveyance direction by at least two or more of the plurality of conveyors.

14. The printing apparatus according to claim 13, further comprising:

a discharge tray, the recording medium having the image recorded thereon by the image recording device being discharged to the discharge tray, wherein the machining device is disposed between the discharge tray and at least one of the conveyors that is configured to discharge the recording medium to the discharge tray in the conveyance direction.

15. The printing apparatus according to claim 13, wherein the controller is configured to cause the machining device to perform one of the (i) cutting, (ii) perforation formation, and (iii) crease formation on the recording medium by moving the machining device in a width direction of the recording medium.

16. The printing apparatus according to claim 13, wherein the plurality of conveyors comprises a first conveyor that is the closest to the machining device in the conveyance direction among the plurality of conveyors, the first conveyor includes at least one roller having an outer peripheral surface formed with a plurality of irregularities.

17. The printing apparatus according to claim 13, wherein the plurality of conveyors comprises a main conveyor that is the farthest from the machining device in the conveyance direction among the plurality of conveyors holding the recording medium when the machining device performs one of the (i) cutting, (ii) perforation formation, and (iii) crease formation, the main conveyor being configured to hold the recording medium with a load larger than those of other conveyors included in the plurality of conveyors.

18. The printing apparatus according to claim 13, wherein the recording medium includes an ordinary type recording medium and a special type recording medium having characteristics different from those of the ordinary recording medium, and wherein the conveyors are configured to hold different types of the recording medium with different holding loads depending on the characteristics of the recording medium.

* * * * *